3,575,982
PROCESS FOR PREPARING BUQUINOLATE
Nicholas D. Harris, Norwich, N.Y., assignor to
The Norwich Pharmacal Company
No Drawing. Filed Oct. 28, 1968, Ser. No. 771,310
Int. Cl. C07d 33/48
U.S. Cl. 260—287                              1 Claim

ABSTRACT OF THE DISCLOSURE

A process for preparing buquinolate by cyclization of diethyl 3,4-diisobutoxyanilinomethylenemalonate with esters of phosphoric acid is described.

---

This invention relates to the preparation of buquinolate, ethyl 4-hydroxy-6,7-diisobutoxy-3-quinolinecarboxylate, a valuable coccidiostat.

A number of processess for preparing buquinolate are known; e.g., U.S. Pats. Nos. 3,267,106 and 3,397,208, involving as an intermediate, the compound 3,4-diisobutoxyanilinomethylenemalonate which is, in terms of the economy of the process, an expensive material. Treatment of this material in the most efficacious manner to secure the end product, buquinolate, is highly desirable.

It has been found that esters of phosphoric acid prepared according to the method of Mukaiyama and Tsujiaki [Bull. Chem. Soc. Japan 34:99–101 (1961)] are effective agents for converting 3,4-diisobutoxyanilinomethylenemalonate to buquinolate. The use of these esters avoids unduly high temperature; the need for glass-lined equipment; and the production of hydrogen chloride and mixed salts thus posing a simpler operation without sacrifice of yield or quality of end product.

The practice of this invention merely involves the reaction of an ester of phosphoric acid with 3,4-diisobutoxyanilinomethylenemalonate preferably in the presence of an inert solvent such as xylene.

In order that this invention may be fully understood by those skilled in the art the following example and various runs pursuant thereto, presented in tabular form, are appended:

To 366 g. of phosphorous pentoxide and 640 cc. of xylene was added 209 cc. of ethanol with ice-bath cooling and at a rate to keep the temperature below 100°. The mixture was cooled to 70° and 407 g. (1 mol) of 3,4-diisobutoxyanilinomethylenemalonate was added, then the reaction mixture was heated at 138–140° for 30 minutes and poured into 1200 cc. of water.

After 1 hour of stirring, buquinolate was collected and washed with water, then 200 cc. of acetone. It weighed 330 g. (91.4% yield), M.P. 278–282°.

| Run No. | Intermediate,[1] gm. | P₂O₅ gm. | Alcohol | Ml. | Solvent | Ml. | Temp. | Time, mins. | Yield, percent | Assay, percent |
|---|---|---|---|---|---|---|---|---|---|---|
| 1 | 30 | 21 | Ethanol | 12 | Xylene | 25 | 140–147 | 30 | 89.5 | 90 |
| 2 | 67 | 56 | ----do---- | 32 | ---do---- | 50 | 140–148 | | 100 | 84.5 |
| 3 | 67 | 56 | Methanol | 22 | ---do---- | 75 | 140 | 60 | 93.5 | 87 |
| 4 | 70 | 63 | Ethanol | 36 | None | | 140–185 | 10 | 100 | 81.7 |
| 5 | 70 | 63 | ----do---- | 36 | Xylene | 75 | 140–147 | 15 | 90.7 | 94.7 |
| 6 | 67 | 56 | n-Propanol | 40 | ---do---- | 50 | 140–148 | 75 | 62 | |
| 7 | 74 | 61 | i-Propanol | 44 | ---do---- | 50 | 141 | 75 | 51 | |
| 8 | 70 | 63 | Ethanol | 36 | ---do---- | 110 | 140–145 | 25 | 93.3 | 94.5 |
| 9 | 407 | 366 | ----do---- | 209 | ---do---- | 640 | 138–141 | 30 | 91.3 | 95 |

[1] 3,4-diisobutoxyanilinomethylenemalonate.

What is claimed is:
1. The method of preparing buquinolate which comprises reacting 3,4-diisobutoxyanilinomethylenemalonate with a lower alkyl ester of phosphoric acid.

References Cited
UNITED STATES PATENTS 3,397,208    8/1968    Berman et al. _____ 260—287
3,414,576    12/1968    Cairns _____ 260—287

OTHER REFERENCES

Mapara et al., Jour. Ind. Chem. Soc., vol. 31, pp. 951–6 (1954).

DONALD G. DAUS, Primary Examiner

U.S. Cl. X.R.

260—471, 950, 980